US012164043B2

(12) United States Patent
Howell et al.

(10) Patent No.: US 12,164,043 B2
(45) Date of Patent: Dec. 10, 2024

(54) SPEED DETERMINATION SYSTEM

(71) Applicant: Airbus Operations Limited, Bristol (GB)

(72) Inventors: George Howell, Bristol (GB); Ashley Bidmead, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 249 days.

(21) Appl. No.: 17/767,657

(22) PCT Filed: Oct. 5, 2020

(86) PCT No.: PCT/EP2020/077774
§ 371 (c)(1),
(2) Date: Apr. 8, 2022

(87) PCT Pub. No.: WO2021/069342
PCT Pub. Date: Apr. 15, 2021

(65) Prior Publication Data
US 2023/0296794 A1    Sep. 21, 2023

(30) Foreign Application Priority Data
Oct. 9, 2019   (GB) ...................................... 1914615

(51) Int. Cl.
*G01S 19/52*      (2010.01)
*G01S 19/47*      (2010.01)
(Continued)

(52) U.S. Cl.
CPC .............. *G01S 19/52* (2013.01); *G01S 19/47* (2013.01); *G01S 19/48* (2013.01); *G01S 19/45* (2013.01); *G01S 19/49* (2013.01)

(58) Field of Classification Search
CPC .......... G01S 19/48; G01S 19/52; G01S 19/45; G01S 19/49; G01S 19/47; G01S 11/00
(Continued)

(56) References Cited

U.S. PATENT DOCUMENTS 5,787,384 A * 7/1998 Johnson ............... G01C 21/165
                                                                 701/472
6,178,363 B1   1/2001 McIntyre et al.
(Continued)

FOREIGN PATENT DOCUMENTS

WO    2013/063392    5/2013

OTHER PUBLICATIONS

International Search Report and Written Opinion of the International Searching Authority for PCT/EP2020/077774, dated Feb. 4, 2021, 8 pages.
(Continued)

*Primary Examiner* — Chuong P Nguyen
(74) *Attorney, Agent, or Firm* — Nixon & Vanderhye P.C.

(57) ABSTRACT

A speed determination system for an aircraft including one or more interfaces arranged to receive first speed data from a first speed measurement system and second speed data from a second speed measurement system. The first speed measurement system provides the first speed data using global positioning system data. The second speed measurement system provides the second speed data based on a second speed measurement. The speed determination system includes a processor arranged to determine whether the data received from the first speed measurement system is reliable. If global positioning data is determined to be reliable, the speed determination system determines a speed from the first speed data and determines correction values for the second speed measurement system. If global positioning data is determined to be unreliable, the speed determination
(Continued)

system determines a speed from the second speed data and the correction values.

15 Claims, 4 Drawing Sheets

(51) Int. Cl.
    *G01S 19/48* (2010.01)
    *G01S 19/45* (2010.01)
    *G01S 19/49* (2010.01)

(58) Field of Classification Search
    USPC ............ 342/357.35, 357.31, 357.32, 357.28, 342/357.3
    See application file for complete search history.

(56) References Cited

U.S. PATENT DOCUMENTS

| | | | | |
|---|---|---|---|---|
| 6,324,448 B1 * | 11/2001 | Johnson | ................ | G01C 5/005 |
| | | | | 340/963 |
| 6,430,479 B1 * | 8/2002 | Johnson | ................... | G01P 3/64 |
| | | | | 342/464 |
| 7,328,104 B2 * | 2/2008 | Overstreet | ............. | G01S 19/47 |
| | | | | 701/472 |
| 9,939,819 B2 * | 4/2018 | Lim | ........................ | G01S 7/411 |
| 10,386,843 B2 * | 8/2019 | Worsham, II | ......... | B64C 13/503 |
| 10,890,668 B2 * | 1/2021 | Worsham, II | ........ | G05D 1/0858 |
| 2008/0077284 A1 * | 3/2008 | Swope | ................... | G05D 1/106 |
| | | | | 701/4 |
| 2008/0262728 A1 * | 10/2008 | Lokshin | .................. | G01S 19/52 |
| | | | | 701/472 |
| 2009/0254278 A1 | 10/2009 | Wang | | |
| 2009/0299554 A1 | 12/2009 | Freissinet | | |
| 2011/0184593 A1 * | 7/2011 | Swope | ................... | G05D 1/106 |
| | | | | 701/4 |
| 2013/0018533 A1 | 1/2013 | Feau et al. | | |
| 2017/0138086 A1 | 5/2017 | Knudsen | | |
| 2017/0336517 A1 | 11/2017 | Petillon | | |
| 2018/0275283 A1 | 9/2018 | Dumas et al. | | |
| 2022/0308597 A1 * | 9/2022 | Melmoth | ............... | G05D 1/085 |
| 2023/0023732 A1 * | 1/2023 | Bidmead | .............. | G01C 21/183 |
| 2023/0266483 A1 * | 8/2023 | Kimishima | ............. | G01S 19/49 |
| | | | | 701/472 |

OTHER PUBLICATIONS

Combined Search and Examination Report for GB1914615.8, dated Apr. 7, 2020, 7 pages.

* cited by examiner

200

202

Determine whether global positioning system data is available to determine a reliable measure of the speed of the aircraft

204 in response to determining that reliable global positioning data is unavailable, determining the speed of the aircraft using a first speed measurement system arranged to determine a speed of the aircraft based on the global positioning system data; and applying one or more correction values to a second speed measurement system, the one or more correction values being determined on the basis of global positioning system data.

206 in response to determining that reliable global positioning data is unavailable, determining the speed of the aircraft using the secondary speed measurement system on the basis of values determined by the secondary speed measurement system and the determined one or more correction values

SPEED DETERMINATION SYSTEM

This application is the U.S. national phase of International Application No. PCT/EP2020/077774, filed Oct. 5, 2020 which designated the U.S. and claims priority to United Kingdom patent application GB 1914615.8, filed Oct. 9, 2019, the entire contents of each of which are hereby incorporated by reference.

TECHNICAL FIELD

The present invention relates to a speed determination system for an aircraft, a method of determining a speed of an aircraft and a computer program for determining a speed of an aircraft.

BACKGROUND

Many systems on modern aircraft, particularly those that provide control over aircraft position and/or trajectory, utilise speed data. During flight, speed data that may be utilised include, for example, an indicated airspeed (IAS), a calibrated airspeed (CAS), an equivalent airspeed (EAS), and a true airspeed (TAS). However, during ground manoeuvres, it is common to use a speed value which accurately indicates the speed of the aircraft relative to the ground, referred to hereinafter as groundspeed.

Modern aircraft typically have multiple systems for determining groundspeed. The most accurate groundspeed measurements may be provided by global positioning system (GPS) data.

However, in some circumstances, while aircraft are manoeuvring around an airfield, particularly in larger airports in which there are multiple large buildings, GPS signals may be temporarily lost or may otherwise become unreliable. In such circumstances, speed values determined on the basis of GPS may accordingly become unreliable. Accordingly, modern aircraft have backup systems for determining groundspeed.

One such system is an inertial reference system (IRS). An IRS determines speed by integrating acceleration values provided by an accelerometer. Another such system is a wheel speed system that determines the groundspeed based on a frequency of rotation of one or more wheels of the undercarriage of the aircraft. However, each of these systems has limitations. For example, in IRS s, errors in measurements of acceleration may accumulate so that speed measurements determined by the IRS inertial reference systems become less accurate over time. In relation to wheel speed measurements, differences in wheel radius resulting from, for example, different tyre pressures might lead to errors in speed measurements.

The present invention mitigates the above-mentioned problems and accordingly may provide a more reliable speed measurement system.

SUMMARY

A first aspect of the present invention provides a speed determination system for an aircraft, comprising one or more interfaces arranged to receive first speed data from a first speed measurement system and second speed data from a second speed measurement system, wherein: the first speed measurement system is arranged to provide the first speed data based on a first speed measurement based on global positioning system data; and the second speed measurement system is arranged to provide the second speed data based on a second speed measurement; and the speed determination system comprises a processor arranged to determine whether the data received from the first speed measurement system is reliable, wherein: if global positioning data is determined to be reliable, the speed determination system determines a speed of the aircraft from the first speed data and determines one or more correction values for the second speed measurement system; and if global positioning data is determined to be unreliable, the speed determination system determines a speed of the aircraft from the second speed data and the determined one or more correction values.

Optionally, the first speed measurement system comprises a global positioning/inertial reference system.

Optionally, the reliability of global positioning data is determined based on a determination of a number of global positioning satellites in communication with the first speed measurement system.

Optionally, the second speed measurement system comprises one of: an inertial speed measurement system, comprising one or more accelerometers, in which a speed measurement is determined on the basis of integrated acceleration values measured by the one or more accelerometers; a wheel speed measurement system, in which a speed measurement is determined on the basis of a frequency of rotation of one or more wheels of the aircraft; and a system arranged to direct energy towards the ground and measure a characteristic of reflected energy.

Optionally, the processor is arranged to determine the speed of the aircraft based on a speed value provided by the inertial speed measurement system when the second speed measurement system determines that the aircraft speed is below a threshold value and to determine the speed of the aircraft based on a speed value determined by the wheel speed measurement system when the second speed measurement system determines that the aircraft speed is above the threshold value.

Optionally, the threshold value is in the range 3 to 7 knots.

Optionally, the threshold value is 5 knots.

Optionally, the processor is arranged to determine a first correction value for the inertial speed measurement system on the basis of a difference between a speed determined by the first speed measurement system and a speed determined by the inertial speed measurement system.

Optionally, the speed determined by the inertial speed measurement system is determined with respect to a stationary position of the aircraft.

Optionally, the inertial speed measurement system is arranged to provide substantially continuous speed measurements.

Optionally, the speed determined by the wheel speed measurement system is based on a frequency of rotation of the one or more wheels during a landing phase.

Optionally, the speed determined by the wheel speed measurement system is determined during the landing phase after wheel brakes are released.

A second aspect of the present invention provides a method of determining a speed of an aircraft, the method comprising: determining whether global positioning system data is available to determine a reliable measure of the speed of the aircraft; in response to determining that reliable global positioning system data is available: determining the speed of the aircraft using a first speed measurement system arranged to determine a speed of the aircraft based on the global positioning system data; and applying one or more correction values to a second speed measurement system, the one or more correction values being determined on the basis of global positioning system data; and in response to determining that reliable global positioning data is unavailable: determining the speed of the aircraft using the second speed measurement system on the basis of values determined by the second speed measurement system and the determined one or more correction values.

A third aspect of the present invention provides an aircraft comprising a speed determination system according to the first aspect.

A fourth aspect of the present invention provides a computer program which, when executed by a processor in a speed determination system according to the first aspect or an aircraft according to the third aspect: determines whether global positioning system data is available to determine a reliable measure of the speed of the aircraft; in response to determining that reliable global positioning system data is available: determines the speed of the aircraft using a first speed measurement system arranged to determine a speed of the aircraft based on the global positioning system data; and applies one or more correction values to a second speed measurement system, the one or more correction values being determined on the basis of global positioning system data; and in response to determining that reliable global positioning data is unavailable: determines the speed of the aircraft using the second speed measurement system on the basis of values determined by the second speed measurement system and the determined one or more correction values.

BRIEF DESCRIPTION OF THE DRAWINGS

Embodiments of the invention will now be described, by way of example only, with reference to the accompanying drawings, in which:

FIG. 2 is a flow diagram illustrating a method of determining a speed of an aircraft according to an example.

DETAILED DESCRIPTION

Figure 1A:
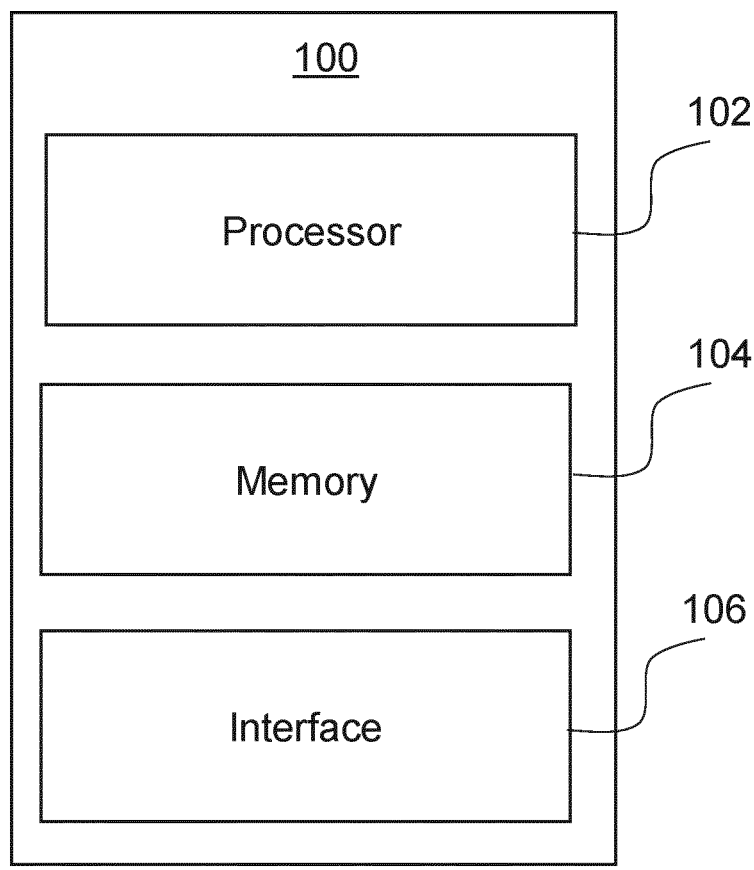
FIG. 1a is schematic diagram illustrating a speed determination system according to an example.

FIG. 1a is schematic diagram of a speed determination system 100 for an aircraft, according to an example.

In the example shown in FIG. 1a, the speed determination system 100 is a computerized device implemented by a processor 102 executing software instructions stored in a memory 104 on the basis of inputs received via an interface 106. For example, the speed determination unit 100 may be an avionics unit installed in an aircraft such as the aircraft described below with reference to FIG. 3.

The interface 106 is arranged to receive speed data from speed measurement systems and to output indicating a speed of the aircraft based in the received speed data.

The inputs may correspond to speed data received from one or more speed measurement systems including a first speed measurement system arranged to provide first speed data and a second speed measurement system arranged to provide second speed data. The first speed measurement system is arranged to provide the first speed data based on a first speed measurement and the second speed measurement system is arranged to provide the second speed data based on a second speed measurement.

Although, in the example shown in FIG. 1a, the speed determination system 100 is implemented in software executed by hardware (processor 102) in some examples, the speed determination system 100 may be implemented entirely in hardware.

Figure 1B:
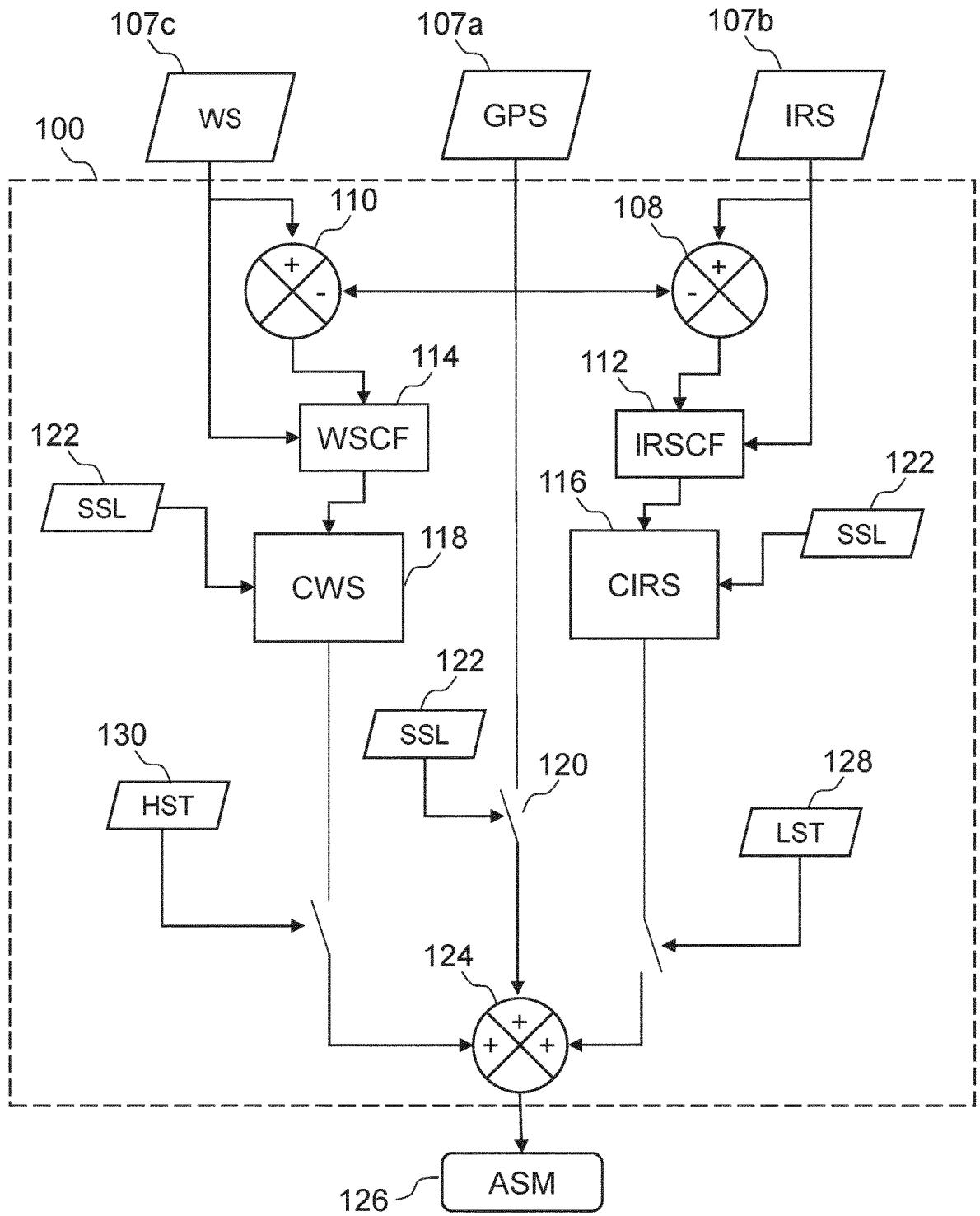
FIG. 1b is a schematic diagram illustrating the operation of a processor arranged to perform a speed determination according to an example.

FIG. 1b is a schematic diagram illustrating the operation of a speed determination system such as the speed determination system 100 described above with reference to FIG. 1a. In this example shown in FIG. 1b, the speed determination system 100 is arranged to receive speed data from three speed measurement systems, one of which corresponds to the first speed measurement system and another of which corresponds to the second speed measurement system.

For example, in the example shown in FIG. 1b, the first speed measurement system is a global positioning system (GPS) based speed measurement system, referred to hereinafter as a GPS system 107a. The GPS system 107a uses global position data received from global positioning satellites to determine a position of the aircraft and determines the speed of the aircraft based on a rate of change of position of the aircraft. The accuracy of the determined position of the aircraft and therefore the accuracy of the speed of the aircraft determined by the GPS system 107a is related to the number of satellites from which the GPS system 107a can receive positioning data.

In some circumstances, such as when the aircraft is near large buildings, GPS signals may be temporarily lost or may otherwise become unreliable. In such circumstances, speed values determined on the basis of GPS may accordingly become unreliable. In such circumstances, the speed determination system 100 shown in FIG. 1a can determine the speed of the aircraft based on a second speed measurement system.

In the example shown in FIG. 1b, the speed determination system 100 comprises two second speed measurement systems: an inertial reference system (IRS) 107b and a wheel speed measurement system (WS) 107c. In other examples, the speed determination 100 may have only of the IRS 107b and the WS 107c or may have other and/or further speed measurement systems.

The IRS 107b may determine speed by integrating acceleration values provided by one or more accelerometers located within the aircraft. The accelerometers may be calibrated (e.g. "zeroed") while the aircraft is stationary and may measure the acceleration of the aircraft over time. By integrating values of acceleration, the IRS 107b determines a value corresponding to the speed of the aircraft. However, because errors in the determined acceleration values accumulate, over time speed values determined by the IRS 107b may become less accurate and are typically less accurate than the GPS system 107a.

The WS 107c determines speed based on a frequency of rotation of one or more wheels of the undercarriage of the aircraft. For example, one or more of the aircraft wheels may be fitted with an encoder arranged to determine a position or degree of rotation of the respective wheel, and the WS 107c may be arranged to receive data representing the position or degree of rotation of the wheel and, based on that data and information about the circumference of the one or more wheels, determine the speed of the aircraft. However, because, for example, the WS uses an estimate of the wheel dimensions, which may be inaccurate due to differences in tyre pressures and/or differences in compression of the tyre under as the weight of the aircraft changes (for example, by consuming fuel), the speed determined by the WS 107c is typically less accurate than the GPS system 107a. Furthermore, the WS 107c may not able to account for differences in wheel speeds between wheels on the left and right (port and starboard) sides of the aircraft during turns, for example. Also, at low speeds the accuracy of the speed determined by the WS 107c drops further due to a loss of signal from the encoder; below about 5 nautical miles per hour (knots), the signal from the encoder is received at too low a rate to be meaningful and so the WS may determine a speed of 0 knots.

In the example shown in FIG. 1b, the speed determination system uses speed data from the GPS system 107a to provide correction values that may be applied to speed values determined by the IRS 107b and the WS 107c so that, in the event that GPS data received by the GPS system 107a becomes unavailable or is determined to be unreliable, the errors in the IRS 107b and WS 107c are minimised.

The correction values may be determined based on a difference between a speed value determined by the GPS system 107a and the respective IRS 107b and WS 107c. In some examples, the difference may be determined by the speed determination system 100 periodically. For example, the difference may be determined at a rate in the range between 2.5 milliseconds (ms) and 80 ms.

In some examples, the correction value may be a factor (i.e. multiplier) applied to the speed value determined by the respective IRS 107b and WS 107c. In other examples, the correction value may be an offset added to or subtracted from the speed value determined by the respective IRS 107b and WS 107c.

In the example of FIG. 1b, the speed determination system 100 comprises a first comparator 108 arranged to determine a difference between a speed value determined by the GPS system 107a and the IRS 107b and a second comparator 110 arranged to determine a difference between a speed value determined by the GPS system 107a and the WS 107c.

The output of the first comparator 108 indicates the correction value for the speed value determined by the IRS 107b, which is applied to an IRS correction function (IRSCF) 112 to correct the speed value determined by the IRS 107b. For example, the correction value may be equal to the difference determined by the first comparator 108.

The output of the second comparator 110 indicates the correction value for the speed value determined by the IRS 107b, which is applied to a WS correction function (WSCF) 114 to correct the speed value determined by the WS 107c.

The result is a corrected inertial reference speed (CIRS) 116 and a corrected wheel speed (CWS) 118.

In one example, at any given time the applied to the speed value determined by the ISR is an offset equal to the difference between the speed value determined by the GPS system 107a and the speed value determined by the IRS 107b or the WS 107c.

In another example, the offset may be determined based on a time-averaged difference between the speed value determined by the GPS system 107a and the speed value determined by the IRS 107b or the WS 107c. In an illustrative example, the offsets are determined at different times, t1, t2 and t3, which in this example are separated by equal amounts of time.

At a first time, t1, a speed value determined by the GPS system 107a may be 10 knots and a speed value determined by the IRS 107b or the WS 107c may be 11 knots, such that the difference is +1 knots. Accordingly, at t1, the offset applied to the speed value determined by the ISR would by −1 knot to provide a CIRS 116 or CWS 118 of 10 knots.

Then at a subsequent second time, t2, a speed value determined by the GPS system 107a may be 10 knots but the speed indicated by the IRS 107b or the WS 107c may have increased to 11.5 knots, such that the difference between the groundspeed indicated by the GPS system 107a and the IRS 107b or the WS 107c is +1.5 knots. At time t2, the offset applied to the speed value determined by the ISR would be equal to the sum of the differences at t1 and t2 divided by 2 i.e. −(1+1.5)/2=−1.25 to provide a CIRS 116 or CWS 118 of 10.25 knots.

At a subsequent second time, t3, a speed value determined by the GPS system 107a may be 10 knots and the speed indicated by the IRS 107b or the WS 107c may have remained at 11.5 knots, such that the difference between the groundspeed indicated by the GPS system 107a and the IRS 107b or the WS 107c remains at +1.5 knots. At time t3, the offset applied to the speed value determined by the ISR would be equal to the sum of the differences at t1, t2 and t3 divided by 3 i.e. −(1+1.5+1.5)/3=−1.33 to provide a CIRS 116 or CWS 118 of 10.17 knots.

Using a time-averaged offset as described above may provide a more stable correction of the speed values determined by the IRS 107b and the WS 107c.

In another example, the correction values may be determined on the basis of a linear regression which generates, for example, a correction factor and a correction offset and optionally an average correction factor and an average correction offset. In yet another example, the correction values may be determined on the basis of a non-linear regression.

Determining the correction values on the basis of a linear regression may, for example, provide more accurate corrections to the speed values determined by the IRS 107b and/or the WS 107c.

The correction factors may, for example, correct for differences between an assumed wheel radius and an actual wheel radius, which causes a multiplier effect on the wheel speed determined by the WS 107c. The correction offsets may, for example, correct for zeroing errors in the hardware of the WS 107c or an accumulated error in the integrated value determined by the IRS 107b.

The speed determination system 100 comprises a source selector 120 arranged to determine whether there is a loss of GPS satellite signal (SSL) 122. A loss of GPS satellite signal (SSL) 122 is determined if the speed determination system 100 determines that the GPS data received by the GPS system 107a is insufficient to generate reliable speed data. If it is determined that the GPS data received by the GPS system 107a is sufficient to generate reliable speed data, then the source selector is arranged to provide data from the GPS system to a combiner 124 (described below). For example, the speed determination system 100 may determine that there is a loss of GPS satellite signal (SSL) 122 if the source selector 120 determines that a number of global positioning satellites in communication with the GPS system 107a is below a threshold number. For example, if the source selector 120 determines the GPS system 107a is receiving GPS data from fewer than five satellites, the source selector 120 may determine that there is a loss of GPS satellite signal (SSL) 122.

While the speed determination system 100 determines that GPS data received by the GPS system 107a is sufficiently reliable to generate reliable speed data, a combiner 124 provides an aircraft speed measurement (ASM) 126, which is a determined speed of the aircraft, using the speed determined by the GPS system 107a. The ASM 126 may be based solely on the GPS system 107a or may combine the speed value from the GPS system 107a with speed values from one or more other systems, for example using a weighted average of the one or more speed values. In some examples, the weighting may be based on determined relative reliabilities of the different sources of speed data. The ASM 126 may be a substantially continuous speed measurement or may be an intermittent speed measurement.

In the event that the speed determination system 100 determines that GPS data received by the GPS system 107*a* is insufficiently reliable to generate reliable speed data, such that there is a loss of satellite signal (SSL) 122, in some examples, the combiner 124 provides an ASM 126 based on one or other (or both) of the corrected inertial reference speed (CIRS) 116 and the corrected wheel speed (CWS) 118. In some examples, each available source of speed data may be assigned an associated weight corresponding to how accurate the speed value is determined to be. In some values the combiner 124 may generate the ASM 126 by selecting the source of speed value data with the highest weight (i.e. the most reliable source). In other examples, the ASM 126 may be determined, for example, based on a weighted average between the CIRS 116 and CWS 118; for example, weights may be applied by the combiner to each of the CIRS 116 and CWS 118 (and possibly other sources of speed values) so that each of the speed values contributes to the ASM 126 according to the applied weight. For example, the weight may relate to an accuracy determined for each source of speed data.

At low speeds, the speed determination system 100 receives a low speed taxi signal (LST) 128. The LST indicates that the speed of the aircraft is below a speed at which speed values determined by the WS 107*c* are reliable. For example, the LST may be received if the aircraft speed is determined to be below 5 knots. However, at higher speeds the speed determination system 100 receives a high-speed taxi signal (HST) 130, indicating that the speed of the aircraft is above a speed at which speed values determined by the WS 107*c* are reliable. For example, the HST 130 may be received during the landing phase, after wheel brakes are released and the aircraft speed is still sufficiently high that speed values determined by the WS a 107*c* are reliable.

In response to receiving an LST 128, the combiner 124 provides an aircraft speed measurement (ASM) 126 using the corrected inertial reference speed (CIRS) 116.

However, in response to receiving an HST 130, the combiner 124 provides an aircraft speed measurement (ASM) 126 using the corrected wheel speed (CWS) 118.

FIG. 2 is a flow diagram illustrating a method 200 of determining a speed of an aircraft. For example, the method 200 may operate under the control of the speed determination system 100 described above with reference to FIG. 1*a* and FIG. 1*b*.

At block 202, a determination is made as to whether global positioning system data is available to determine a reliable measure of the speed of the aircraft. For example, the determination may be made on the basis of whether there is sufficient global positioning data available to determine a reliable measure of the speed of the aircraft. Such a determination may, for example, by the source selector 120 described above with reference to FIG. 1*b*. For example, the determination may be made on the basis of a loss of signal 122 as described above with reference to FIG. 1*b*. For example, the source selector 120 may determine that there is a loss of GPS satellite signal (SSL) 122 if a number of global positioning satellites in communication with the GPS system 107*a* is below a threshold number. For example, if the GPS system 107*a* determines that is receiving GPS data from fewer than five satellites, the GPS system 107*a* may determine that there is a loss of GPS satellite signal (SSL) 122.

At block 204, in response to determining that reliable global positioning data is available, the speed of the aircraft is determined on the basis of a first speed measurement system arranged to determine a speed of the aircraft. The first speed measurement is based on global positioning system data and applying one or more correction values to a second speed measurement system, the one or more correction values being determined on the basis of global positioning system data. For example, if the source selector 120 described above with reference to FIG. 1*b* determines that there is no loss of signal 122, speed data from the GPS system 107*a* may be used to provide the ASM 126.

At block 206, in response to determining that reliable global positioning data is unavailable, determining the speed of the aircraft using the second speed measurement system on the basis of values determined by the second speed measurement system and the determined one or more correction values. For example, if the source selector 120 described above with reference to FIG. 1*b* determines that there is a loss of signal 122, speed data from either the IRS 107*b* or the WS 107*c* may be used to provide the ASM 126.

Figure 3:
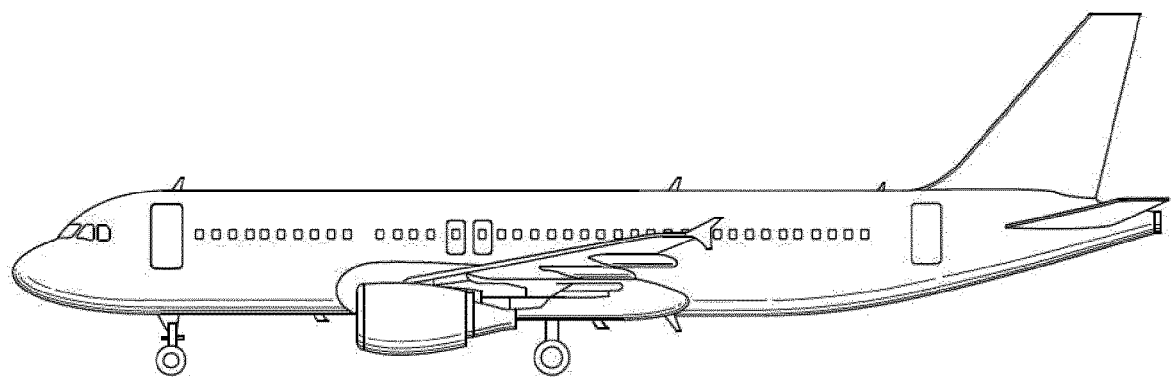
FIG. 3 is a schematic diagram of an aircraft according to an example.

In some embodiments, the speed determination system 100 described above with reference to FIG. 1*a* and FIG. 1*b* may be installed in an aircraft. Referring to FIG. 3, there is shown a schematic front view of an example of an aircraft 300 according to an embodiment of the invention. The aircraft 300 may comprise one or more speed determination systems such as the speed determination system 100 described above with reference to FIGS. 1*a* and 1*b*.

In some examples the GPS system 107*a* described above may be a global positioning/inertial reference system (GP/IRS) which combines GPS data with inertial reference system (IRS) data to determine a measurement of groundspeed.

In the examples described above, the speed determination system 100 uses, as its main source of speed data a GPS system and inertial reference and/or wheel speed data as secondary sources of speed data. However, in other examples, other sources of speed data are envisaged for either the main speed data source or the secondary speed data source. For example, speed data may be obtained by directing energy (such as a laser beam or radio waves) towards the ground and measuring a characteristic of reflected energy, such as time-of-flight or redshift.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. A speed determination system for an aircraft, comprising one or more interfaces configured to receive first speed data from a first speed measurement system and second speed data from a second speed measurement system, wherein:

the first speed measurement system is configured to provide the first speed data based on a first speed measurement based on global positioning system data; and the second speed measurement system is configured to provide the second speed data based on a second speed measurement; and the speed determination system comprises a processor configured to determine whether the global positioning data received from the first speed measurement system is reliable, wherein:

if global positioning data is determined to be reliable, the speed determination system determines a speed of the aircraft from the first speed data and determines one or more correction values for the second speed measurement system based on (i) a value determined by the second speed measurement system and (ii) the global positioning system data or a value generated by the first speed measurement system; and if global positioning data is determined to be unreliable, the speed determination system determines a speed of the aircraft from the second speed data and the determined one or more correction values.

2. The speed determination system according to claim 1, wherein the first speed measurement system comprises a global positioning/inertial reference system.

3. The speed determination system according to claim 1, wherein the global positioning data is determined to be reliable based on a determination of a number of global positioning satellites in communication with the first speed measurement system.

4. The speed determination system according to claim 1, wherein the second speed measurement system comprises one of:

an inertial speed measurement system comprising one or more accelerometers and the inertial speed measurement system determines the second speed data based on integrated acceleration values measured by the one or more accelerometers;

a wheel speed measurement system which determines the second speed data based on a frequency of rotation of one or more wheels of the aircraft; and a system configured to direct energy towards the ground and measure a characteristic of reflected energy to determine the second speed data.

5. The speed determination system according to claim 4, wherein the processor is configured to determine the speed of the aircraft based on a speed value provided by the inertial speed measurement system when the second speed measurement system determines that the aircraft speed is below a threshold value and to determine the speed of the aircraft based on a speed value determined by the wheel speed measurement system when the second speed measurement system determines that the aircraft speed is above the threshold value.

6. The speed determination system according to claim 5, wherein the threshold value is in the range 3 to 7 knots.

7. The speed determination system according to claim 6, wherein the threshold value is 5 knots.

8. The speed determination system according to claim 4, wherein the processor is configured to determine a first correction value of the one or more correction values based on a difference between a speed determined by the first speed measurement system and a speed determined by the inertial speed measurement system.

9. The speed determination system according to claim 8, wherein the speed determined by the inertial speed measurement system is determined with respect to a stationary position of the aircraft.

10. The speed determination system according to claim 8, wherein the inertial speed measurement system is configured to provide substantially continuous speed measurements.

11. The speed determination system according to claim 1, wherein the speed determined by the wheel speed measurement system is based on a frequency of rotation of the one or more wheels during a landing phase.

12. The speed determination system according to claim 11, wherein the speed determined by the wheel speed measurement system is determined during the landing phase after wheel brakes are released.

13. A method of determining a speed of an aircraft, the method comprising:

determining whether global positioning system data is available to determine a reliable measure of the speed of the aircraft;

in response to the determining that the global positioning system data is available to determine the reliable measure:

determining the speed of the aircraft using a first speed measurement system configured to determine a speed of the aircraft based on the global positioning system data; and applying one or more correction values to a second speed measurement system, the one or more correction values being determined based on (i) global positioning system data or values determined by the first speed measurement system, and (ii) on values determined by the second measurement system; and in response to the determining that the global positioning data is unavailable, determining the speed of the aircraft using the second speed measurement system based on values determined by the second speed measurement system while the global positioning data is unavailable and the determined one or more correction values.

14. An aircraft comprising the speed determination system according to claim 1.

15. A computer program which, when executed by a processor, causes the processor to:

determine whether global positioning system data is available to determine a reliable measure of the speed of an aircraft; and in response to determining that reliable global positioning system data is available:

determine the speed of the aircraft using a first speed measurement system configured to determine a speed of the aircraft based on the global positioning system data; and apply one or more correction values to a second speed measurement system, the one or more correction values being determined based on (i) global positioning system data or values determined by the first speed measurement system and (ii) values determined by the second speed measurement system; and in response to determining that reliable global positioning data is unavailable, determine the speed of the aircraft using the second speed measurement system based on values determined by the second speed measurement system while the global positioning data is unavailable and the determined one or more correction values.

* * * * *